United States Patent
Mokrushin et al.

(10) Patent No.: US 12,245,055 B2
(45) Date of Patent: Mar. 4, 2025

(54) METHODS, APPARATUS AND MACHINE-READABLE MEDIUMS FOR MITIGATING POWER FAILURES IN A COMMUNICATION NETWORK

(71) Applicant: Telefonaktiebolaget LM Ericsson (publ), Stockholm (SE)

(72) Inventors: Leonid Mokrushin, Uppsala (SE); Abhishek Sarkar, Bengaluru (IN); Selim Ickin, Stocksund (SE); Kaushik Dey, Kolkata (IN); Ashis Kumar Roy, Durgapur (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 560 days.

(21) Appl. No.: 17/291,465

(22) PCT Filed: Feb. 15, 2019

(86) PCT No.: PCT/EP2019/053778
§ 371 (c)(1),
(2) Date: May 5, 2021

(87) PCT Pub. No.: WO2020/094259
PCT Pub. Date: May 14, 2020

(65) Prior Publication Data
US 2022/0007213 A1    Jan. 6, 2022

(30) Foreign Application Priority Data
Nov. 6, 2018 (IN) .............................. 201811041998

(51) Int. Cl.
H04W 24/04  (2009.01)
B64U 101/60 (2023.01)
(Continued)

(52) U.S. Cl.
CPC .......... *H04W 24/04* (2013.01); *G05D 1/0022* (2013.01); *H02J 3/38* (2013.01);
(Continued)

(58) Field of Classification Search
CPC ......... H04W 24/04; H04W 24/08; H02J 3/38; H02J 7/0013; H02J 7/0047; H02J 9/06;
(Continued)

(56) References Cited

U.S. PATENT DOCUMENTS

| | | | | |
|---|---|---|---|---|
| 2014/0052306 A1* | 2/2014 | Motobayashi | ............ | H02J 9/06 307/23 |
| 2016/0043814 A1* | 2/2016 | Bishop | .................... | H04L 43/06 370/242 |

(Continued)

FOREIGN PATENT DOCUMENTS

| | | |
|---|---|---|
| CN | 107277792 A | 10/2017 |
| WO | 2011135293 A2 | 11/2011 |

OTHER PUBLICATIONS

Charge selection algorithms for maximizing sensor network life with UAV-based limited wireless recharging (Year: 2013).*

(Continued)

*Primary Examiner* — Ig T An
*Assistant Examiner* — Christine Nguyen Huynh
(74) *Attorney, Agent, or Firm* — Rothwell, Figg, Ernst & Manbeck, P.C.

(57) ABSTRACT

The disclosure provides methods, apparatus and machine-readable mediums for mitigating power failures in base stations in wireless communication networks. In one aspect of the disclosure, a method for mitigating power failures in a wireless communication network is provided. The method comprises, responsive to a determination that a primary power supply for a base station in the wireless communication network has failed or is predicted to fail, initiating (Continued)

deployment of an unmanned aerial vehicle to the base station to charge one or more batteries providing a secondary power supply for the base station.

18 Claims, 5 Drawing Sheets

(51) Int. Cl.
    *G05D 1/00*     (2024.01)
    *H02J 3/38*     (2006.01)
    *H02J 7/00*     (2006.01)
    *H02J 9/06*     (2006.01)
    *H04W 24/08*     (2009.01)

(52) U.S. Cl.
    CPC .......... *H02J 7/0013* (2013.01); *H02J 7/0047* (2013.01); *H02J 9/06* (2013.01); *H04W 24/08* (2013.01); *B64U 2101/60* (2023.01); *H02J 2203/20* (2020.01); *H02J 2300/20* (2020.01)

(58) Field of Classification Search
    CPC ............... H02J 2203/20; H02J 2300/20; H02J 2207/40; B64C 39/024; B64U 2101/00; G05D 1/0022
    See application file for complete search history.

(56) References Cited

U.S. PATENT DOCUMENTS

| | | | | |
|---|---|---|---|---|
| 2016/0209472 | A1* | 7/2016 | Chow | G01R 31/3648 |
| 2016/0328979 | A1* | 11/2016 | Postrel | G08G 5/0008 |
| 2017/0203850 | A1* | 7/2017 | Wang | H02J 7/34 |
| 2017/0366980 | A1 | 12/2017 | Priest et al. | |
| 2018/0052431 | A1* | 2/2018 | Shaikh | H02J 3/003 |
| 2019/0097447 | A1* | 3/2019 | Partovi | H02J 50/70 |

OTHER PUBLICATIONS

J. Johnson, E. Basha and C. Detweiler, "Charge selection algorithms for maximizing sensor network life with UAV-based limited wireless recharging," 2013 IEEE Eighth International Conference on Intelligent Sensors, Sensor Networks and Information Processing, Melbourne, VIC, Australia, 2013, pp. 159-164 (Year: 2013).*

International Search Report and the Written Opinion of the International Searching Authority, issued in corresponding International Application No. PCT/EP2019/053778, dated Mar. 20, 2019, 12 pages.

Jennifer Johnson et al, "Charge selection algorithms for maximizing sensor network life with UAV-based limited wireless recharging", Intelligent Sensors, Sensor Networks and Information Processing, 2013 IEEE Eighth International Conference on, IEEE,Apr. 2, 2013 (Apr. 2, 2013), p. 159-164, XP032422529.

* cited by examiner

METHODS, APPARATUS AND MACHINE-READABLE MEDIUMS FOR MITIGATING POWER FAILURES IN A COMMUNICATION NETWORK

CROSS REFERENCE TO RELATED APPLICATION(S)

This application is a 35 U.S.C. § 371 National Phase Entry Application from PCT/EP2019/053778, filed Feb. 15, 2019, designating the United States, and also claims the benefit of Indian Application No. 201811041998, filed Nov. 6, 2018, the disclosures of which are incorporated herein by reference in their entirety.

TECHNICAL FIELD

Embodiments of the present disclosure relate to communication networks, and particularly to methods, apparatus and machine-readable mediums for mitigating power failures in base stations in communication networks.

BACKGROUND

Electrical grid networks are often used to supply power to base stations and other network nodes of wireless communication networks. However, such electrical networks can be prone to outages. Base stations may additionally or alternatively use local power supplies, such as renewable energy technologies, generators or fuel cells. However, renewable energy technologies such as solar cells or wind turbines may not be able to provide a consistent source of power depending on weather conditions. Generators and fuel cells may be subject to failures or may run out of fuel. Such disruptions can lead to temporary power outages at a base station, suspending its operation and leading to a loss of service or limited service provision for wireless devices in cells served by the base station.

To mitigate the impact of such disruptions, base stations are often coupled to more than one power supply, termed herein a primary power supply and a secondary power supply. The primary power supply for a base station will typically be an electrical grid network, as described above. The secondary power supply may act as a backup to the primary power supply, for use in the event that the primary power supply fails. Examples of secondary power supplies include batteries or a generator. If the primary power supply for a base station fails, the base station switches to the secondary power supply until the primary power supply is restored. A base station may be provided with more than one secondary power supply, such that the secondary power supplies may be used as sequential back-up supplies in the event that a secondary power supply also fails. For example, if a generator serving as a secondary power supply fails, the base station may then switch to one or more batteries for power.

However, even these provisions may not always be sufficient in the case of a prolonged primary power supply outage. If the secondary power supplies fail, or are unable to provide sufficient power to the base station, the base station is unable to function until an engineer can make a site visit or the primary power supply is restored. Some base stations may be located at remote sites that are difficult to access, or may be located at restricted sites that can only be accessed at particular times of day or year. This can lead to prolonged periods of connectivity loss in the coverage area served by the base station.

SUMMARY

Embodiments of the present disclosure seek to address these and other problems.

In a first aspect, the present disclosure provides a method for mitigating power failures in a wireless communication network. The method comprises, responsive to a determination that a primary power supply for a base station in the wireless communication network has failed or is predicted to fail, initiating deployment of an unmanned aerial vehicle to the base station to charge one or more batteries providing a secondary power supply for the base station.

Apparatus for performing the method set out above, such as a management apparatus, is also provided.

For example, one aspect provides a management apparatus for mitigating power failures in a wireless communication network. The management apparatus comprises processing circuitry, a machine-readable medium coupled to the processing circuitry and storing code which, when executed by the processing circuitry, causes the management apparatus to, responsive to a determination that a primary power supply for a base station in the wireless communication network has failed or is predicted to fail, initiate deployment of an unmanned aerial vehicle to the base station to charge one or more batteries providing a secondary power supply for the base station.

In another example, a further aspect provides a management apparatus for mitigating power failures in a wireless communication network. The management apparatus comprises an initiating module, which is configured to, responsive to a determination that a primary power supply for a base station in the wireless communication network has failed or is predicted to fail, initiate deployment of an unmanned aerial vehicle to the base station to charge one or more batteries providing a secondary power supply for the base station.

Another aspect of the disclosure provides a method in an unmanned aerial vehicle for mitigating power failures in a wireless communication network. The method comprises flying to a base station in the wireless communication network, selecting a power source from a plurality of power sources in the unmanned aerial vehicle, and charging one or more batteries providing a secondary power supply for the base station using the selected power source.

Apparatus for performing the method set out above, such as an unmanned aerial vehicle, is also provided.

In one example, an aspect of the disclosure provides an unmanned aerial vehicle for mitigating power failures in a wireless communication network. The unmanned aerial vehicle comprises processing circuitry, a plurality of power sources, and a machine-readable medium. The machine-readable medium is coupled to the processing circuitry and stores code which, when executed by the processing circuitry, causes the unmanned aerial vehicle to fly to a base station in the wireless communication network, select a power source from the plurality of power sources in the unmanned aerial vehicle, and charge one or more batteries providing a secondary power supply for the base station using the selected power source.

In another example, a further aspect provides an unmanned aerial vehicle for mitigating power failures in a wireless communication network. The unmanned aerial vehicle comprises a selection module. The selection module is configured to select, once the UAV has flown to a base station in the wireless communication network, a power source from a plurality of power sources in the unmanned aerial vehicle. The selection module is further configured to charge one or more batteries providing a secondary power supply for the base station using the selected power source.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
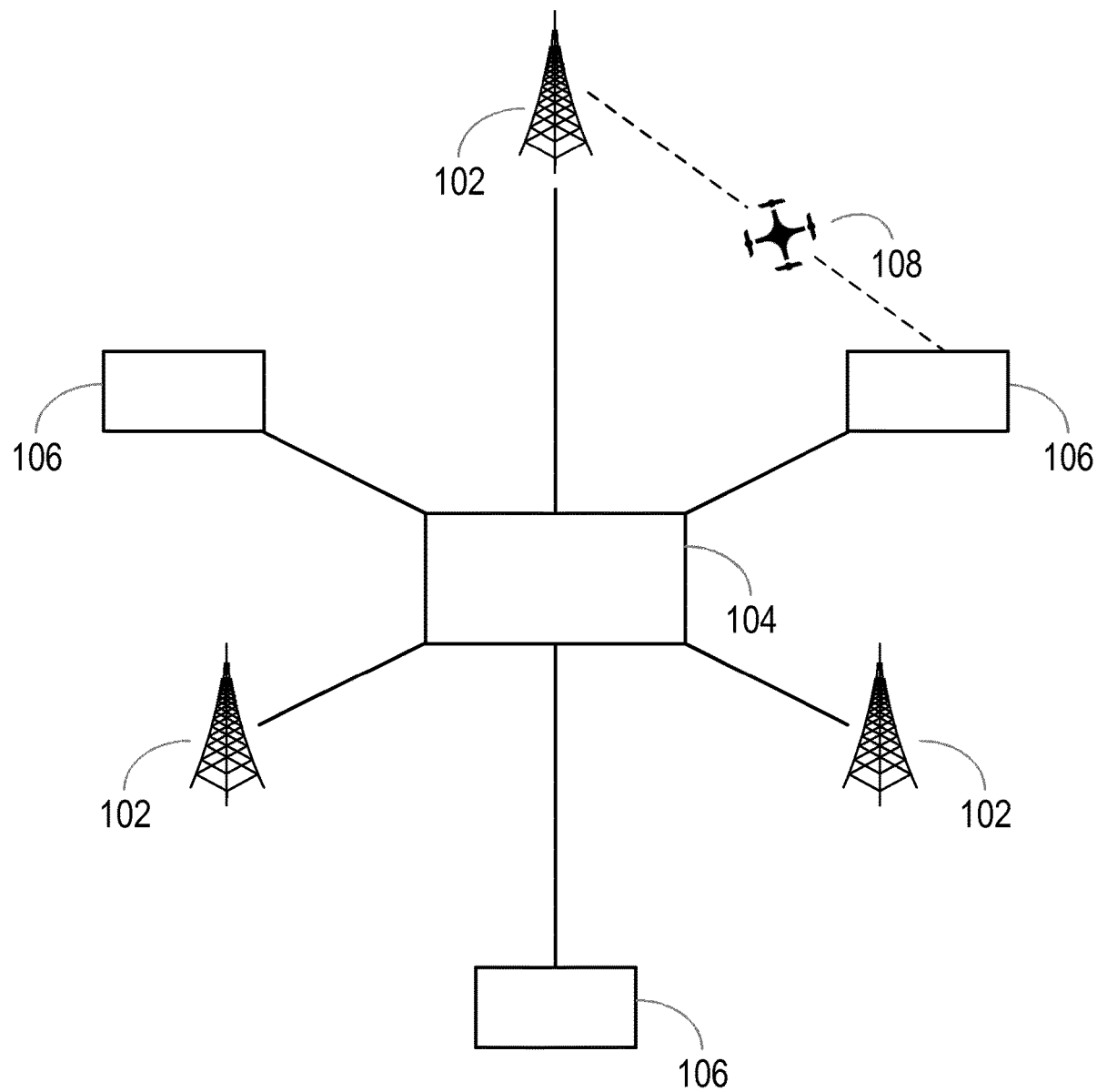
FIG. 1 is a schematic diagram of a communication system according to embodiments of the disclosure.

FIG. 1 shows a communication system 100 according to embodiments of the present disclosure. The system 100 may implement any suitable wireless communications protocol or technology, such as Global System for Mobile communication (GSM), Wide Code-Division Multiple Access (WCDMA), Long Term Evolution (LTE), New Radio (NR), WiFi, WiMAX, or Bluetooth wireless technologies. In one particular example, the system 100 forms part of a cellular telecommunications network, such as the type developed by the $3^{rd}$ Generation Partnership Project (3GPP). Those skilled in the art will appreciate that various components of the system 100 are omitted from FIG. 1 for the purposes of clarity.

The system 100 comprises at least one base station 102. In the illustrated embodiment, three base stations 102 are shown, although the skilled person will appreciate that the system 100 may comprise any number of base stations, and may comprise many more base stations than those shown. The base stations 102 may be NodeBs, eNodeBs, gNodeBs or any other suitable network access point.

Each base station 102 is coupled to one or more power supplies (not illustrated). The one or more power supplies include a primary power supply and one or more batteries for providing a secondary power supply for the base station 102. The primary power supply may comprise an electrical power grid, a generator, a solar cell, a wind turbine, a water turbine, a fuel cell or any other suitable power supply or power source. The term "battery" may refer to any suitable energy storage device.

As discussed above, base stations in communication networks may be affected by power failures in electrical grid networks supplying the base stations or in other apparatuses supplying power to the base stations. Power failures can disrupt base station operations, leading to a loss of service or limited service provision for wireless devices in cells served by the base station. Base stations are often coupled to one or more power supplies including a primary power supply and a secondary power supply in order to mitigate the impact of power failures.

Thus in the event of a failure in the primary power supply for the base station 102 in the communication system 100, the one or more batteries coupled to the base station 102 serve as a secondary power supply to the base station 102. If the batteries have sufficient charge to supply the base station 102 for the duration of the power failure, then operation of the base station 102 may not be affected by the failure of the primary power supply. However, in the case of prolonged outages, the batteries may not have sufficient charge to supply the base station 102 for the duration of the power failure, in which case the batteries may supply power to the base station 102 only until they have become discharged. Once the batteries are discharged, the base station is effectively unpowered, leading to a loss of service or limited service provision for wireless devices in cells served by the base station 102. Further, deeply discharging the base station batteries (i.e. allowing the batteries to discharge more than a threshold percentage of their capacity) may affect a performance and/or lifetime of the batteries.

According to embodiments of the disclosure, one or more unmanned aerial vehicles (UAVs), or drones, are used to charge the batteries providing a secondary power supply for the base station 102, in order to mitigate the impact of power failures in the primary power supply. If a primary power supply for the base station 102 fails or is predicted to fail, a UAV may be deployed to the base station 102 to charge batteries providing the secondary power supply for the base station 102. The batteries for the base station 102 can thus be replenished, thereby delaying or preventing interruptions to the operation of the base station 102 caused by the power failure. This method may be particularly useful in parts of the world where the electrical grid network is prone to outages, or for base stations that rely on renewable energy technologies as their primary power supplies.

In some embodiments of the disclosure, deploying a UAV to the base station 102 to charge the base station batteries may prevent the batteries from being subject to a so-called deep discharge. A base station battery may be considered to have been subject to a deep discharge if it has supplied a threshold percentage of its capacity to the base station 102. Since deep discharges may affect the lifetime and/or performance of the base station batteries, embodiments of the present disclosure may thus lead to improvements in the lifetime and/or performance of base station batteries.

In a further aspect of the disclosure, a UAV deployed to a base station which is subject to a power failure may be operable to select a power supply from a plurality of available power supplies, with which to charge the batteries of the base station.

Accordingly, in some embodiments of the disclosure the system 100 also comprises a management apparatus 104 and one or more UAV depots 106. The management apparatus 104 is communicably coupled to at least one base station 102 and at least one UAV depot 106. The management apparatus 104 is operable to determine whether a primary power supply in the base station 102 has failed or is predicted to fail, and to initiate deployment of a UAV 108 from the UAV depot 106. The management apparatus 104 may be implemented within a base station 102, or in another network node of the system 100 (e.g., a standalone or dedicated network node). Alternatively or additionally, the functions of the management apparatus 104 may be distributed across multiple nodes of the network, such as one or more of the UAV 108, the UAV depot 106, and the base station 102. The functions of the management apparatus 104 will be discussed in greater detail below.

In the illustrated embodiment, three UAV depots 106 are shown, although the skilled person will appreciate that the system 100 may comprise any number of UAV depots 106, including a single UAV depot. Each UAV depot 106 is operable to deploy one or more UAVs 108 to the base stations 102.

The UAV 108 is operable to fly to the base station 102 upon its deployment. The UAV 108 comprises or has access to one or more power sources. The one or more power sources may comprise a solar cell, a wind turbine, a UAV battery, a generator, a water turbine and/or any other suitable power source. The UAV 108 is operable to charge the one or more batteries providing a secondary power supply for the base station 102 using at least one of the one or more power sources in or accessible by the UAV 108. The function of the UAV 108 will be discussed in greater detail below.

Figure 2:
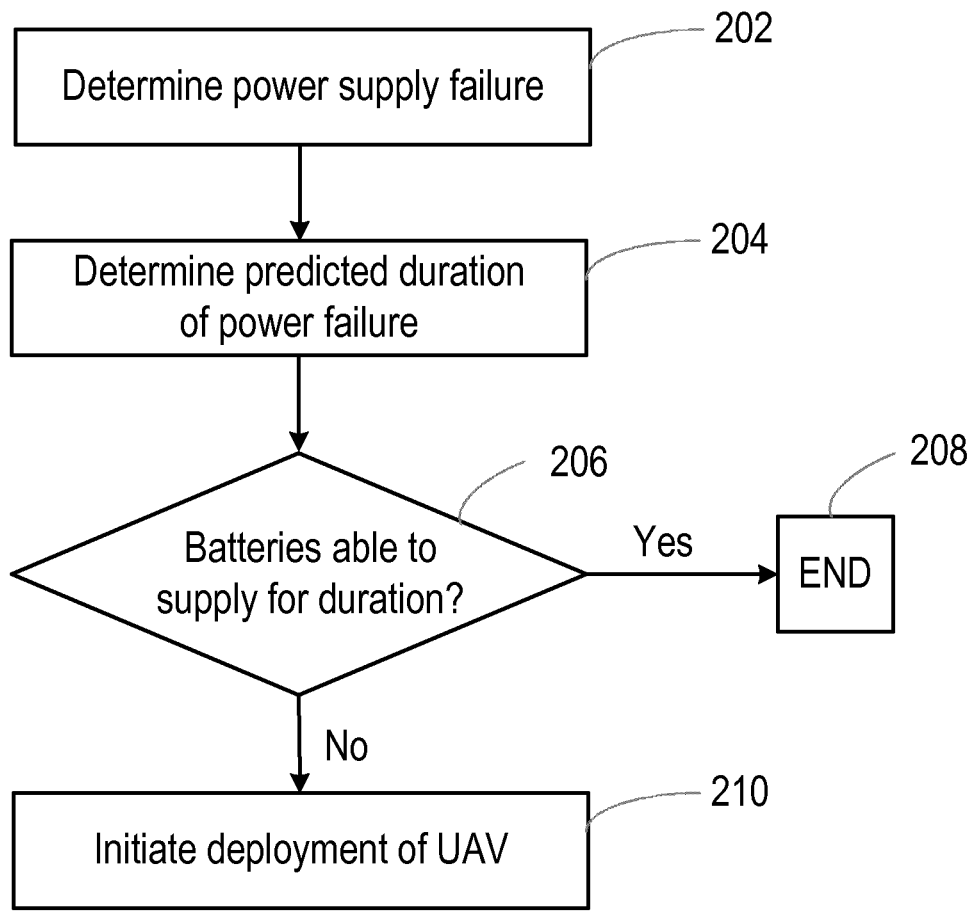
FIG. 2 is a flowchart of a method according to embodiments of the disclosure.

FIG. 2 is a flowchart of a method 200 in a communication network according to embodiments of the disclosure. The method may be implemented in a management apparatus or node of the network, such as the management apparatus 104 illustrated in FIG. 1.

The method begins in step 202, in which it is determined that the primary power supply of a base station 102 in the communication network has failed or is predicted to fail. Thus the determination in step 202 may relate to the present state of the primary power supply of the base station (i.e., that the primary power supply has failed), or the future state of the primary power supply of the base station (i.e., that the primary power supply is predicted to fail).

In the former case, the determination that the primary power supply of the base station 102 has failed may be based on signalling from the base station 102. For example, the management apparatus may receive a message from the base station 102 comprising an indication that the primary power supply of the base station 102 has failed. The message may be transmitted directly to the management apparatus or indirectly, via one or more intermediate network nodes (e.g. mobile devices, UEs, further base stations, etc).

Additionally or alternatively, the determination that the primary power supply of the base station 102 has failed may be based on a lack of signalling from the base station 102. For example, a base station 102 may be scheduled to transmit, to a node in the communication network (e.g., the management apparatus, mobile devices, etc), a signal at a particular time or a series of signals at particular time intervals (e.g. system information, synchronization signals, etc). If the node does not receive such a transmission at an associated expected time, then it may be assumed that operation of the base station 102 has been interrupted. If the node is not the management apparatus (e.g. if the node is a mobile device or another network node), the node may transmit a signal to the management apparatus comprising an indication that the base station 102 has stopped operating as expected. Based on this lack of signalling, the management apparatus may thus determine that the primary power supply of the base station 102 has failed.

In some embodiments, the determination that the primary power supply of the base station 102 has failed may be based on signalling from another node in the communication network. For example, the management apparatus 104 may receive a message from a node associated with an electric grid network supplying the primary power supply to the base station 102, comprising an indication that the electric grid network has failed.

In embodiments relating to a determination that the primary power supply of the base station 102 is predicted to fail, the determination may be obtained from a predictive failure model. The predictive failure model may output a probability associated with a potential failure of the primary power supply. The probability may be associated with a particular time period. For example, the predictive failure model may predict that the primary power supply for a particular base station has a 30% chance of failure in the next six months.

The predictive failure model may comprise a regression model. The predictive failure model may be developed using a machine-learning algorithm. Several different machine learning techniques may be used for the machine-learning algorithm, including decision trees, random forests, neural networks, recurrent neural networks/long-short term memory etc. The present disclosure is not limited in that respect.

In step 204, a predicted duration of the power failure is determined. The predicted duration may be a default duration. The default duration may be generic, i.e. defined for any base station or for any base station in the communication network. Alternatively, the default duration may be specific to the base station 102 or a group of base stations to which the base station 102 belongs. For example, the default duration may be specific to a group of base stations that are all coupled to one electrical grid network. For example, the default duration may be specific to a group of base stations that use renewable energy technologies or a particular type of renewable technology as a primary power supply.

The predicted duration may be a time period that commences from the time at which the primary power supply is predicted to fail, or from the time at which the primary power supply fails, or from the determination that the primary power supply has failed. The predicted duration may end at the time at which the primary power supply is predicted to be restored, or at which an alternative power supply is predicted to start supplying power for the base station.

Alternatively, the predicted duration may end at the time at which an engineer is predicted to arrive at a site of the base station 102. In this case, the predicted duration may be determined, for example, based on one or more of the following: the location of the site, proximity of one or more engineers to the site, availability of one or more engineers and accessibility of the site for one or more engineers. For example, an engineer may be dispatched to the base station site responsive to a determination that the primary power supply of the base station has failed or is predicted to fail, or may be scheduled to visit the base station site in order to repair or maintain the primary power supply.

In some embodiments, the predicted duration of the failure of the primary power supply may be obtained from a predictive duration model. The predictive duration model may be the same as the predictive failure model used in step 202. That is, the same predictive model may be used for predicting both that a primary power supply will fail, and the duration of that primary power supply failure. Alternatively, the predictive duration model may be different to the predictive failure model used in step 202, with separate predictive models being used to predict that a primary power supply will fail, and the duration of that primary power supply failure. The predictive duration model may comprise a regression model. The predictive duration model may be developed using a machine-learning algorithm. Several different machine learning techniques may be used for the machine-learning algorithm, including decision trees, random forests, neural networks, recurrent neural networks/long-short term memory etc. The present disclosure is not limited in that respect.

The predictive failure model of step 202 and/or the predictive duration model of step 204 may take measurement data relating to historical performance of the primary power supply as input. The measurement data may include data relating to or comprising the frequency, duration and/or severity of prior failures of the primary power supply. The measurement data may include data relating to or comprising a time interval since a failure of the primary power supply. The measurement data may include data relating to or comprising weather conditions preceding or during prior failures of the primary power supply.

The predictive failure model of step 202 and/or the predictive duration model of step 204 may take measurement or forecasting data relating to weather conditions affecting the primary power supply as input. For example, cloud cover and/or sunlight intensity may affect the power generated by a solar cell. For example, wind speeds may affect the power generated by a wind turbine. For example, flow rates of water in a watercourse or body of water may affect the power generated by a water turbine. For example, adverse weather conditions, including but not limited to snow, ice and lightning may cause damage to the primary power supply.

The predictive failure model of step 202 and/or the predictive duration model of step 204 may take information relating to maintenance or construction works affecting the base station 102 or the primary power supply as input. For example, if the base station 102 is coupled to an electrical grid network, planned maintenance works performed in the electrical grid network may disrupt a supply of power to the base station 102. Information relating to the planned maintenance works may thus be used as input for the predictive failure model and/or the predictive duration model. The maintenance works may be performed locally to the base station 102 or elsewhere in the electrical grid network.

The method then proceeds to step 206. In step 206, it is determined whether the batteries providing a secondary power supply to the base station 102 are able to provide power to the base station for the predicted duration of the failure of the primary power supply.

The determination as to whether the batteries are able to power the base station 102 for the predicted duration may be based on a number of factors. The factors may relate to one or more of: a current state of the one or more batteries and a historical performance of the one or more batteries. These factors may include one or more of: a predicted power consumption of the base station 102, a discharge rate for the one or more batteries, a remaining charge of the one or more batteries, a degradation curve for the one or more batteries, and measurement data relating to a temperature of the one or more batteries. For example, the determination may be based on a comparison of an estimate of the energy usage for the base station 102 over the predicted duration with the remaining charge of the batteries. The estimate of the energy usage may be based on the predicted power consumption of the base station 102 and the predicted duration.

The degradation curve for the one or more batteries may comprise measurement data relating to a capacity of the one or more batteries as a function of charge cycle count for the one or more batteries. In some embodiments, the determination as to whether the batteries are able to power the base station 102 for the predicted duration may be based on a predicted remaining capacity for the one or more batteries obtained from the degradation curve. The degradation curve for the one or more batteries may be provided by a manufacturer of the one or more batteries, or may be determined based on historical measurement data relating to a capacity of the one or more batteries, for example.

The degradation curve for the one or more batteries may be generic (i.e. defined for any battery) or the degradation curve for the one or more batteries may be specific to the one or more batteries or to a group of batteries comprising the one or more batteries. In some example embodiments, the degradation curve for the one or more batteries may be specific to a group of batteries sharing particular characteristics. For example, the degradation curve may be specific to a particular battery type, such as lithium-ion batteries. For example, the degradation curve may be specific to a group of one or more batteries providing secondary power supplies to base stations in particular climates. For example, the degradation curve may be specific to a group of one or more batteries that have been subject to discharges in a particular range of discharge depths. For example, the degradation curve may be specific to a group of one or more batteries that have been subject to charging voltages above a particular threshold voltage or within a particular range of voltages.

The degradation curve for the one or more batteries may be determined using a predictive degradation model. The predictive degradation model may be developed using a machine-learning algorithm. Several different machine learning techniques may be used for the machine-learning algorithm, including decision trees, random forests, neural networks, recurrent neural networks/long-short term memory etc. The present disclosure is not limited in that respect.

If, in step 206, it is determined that the batteries are able to power the base station for the predicted duration, then the method ends in step 208. That is, no further action is required to charge the batteries or to provide an alternative power supply, as the present batteries are expected to supply power for the duration of the failure of the primary power supply.

If, in step 206, it is determined that the batteries are not able to power the base station for the predicted duration, the method proceeds to step 210.

In step 210, deployment of a UAV 108 to the base station 102 is initiated, to enable the UAV 108 to charge the one or more batteries of the base station 102. For example, the management apparatus may transmit a signal to the UAV depot 106 instructing the UAV depot 106 to deploy a UAV (e.g. the UAV 108) to the base station 102. Alternatively, the management apparatus may transmit a signal to the UAV 108 instructing the UAV 108 to fly to the base station 102. In either case, the signal may comprise an indication of the location of the base station 102 (e.g., co-ordinates, etc).

In some embodiments steps 204 and 206 may be omitted. In such embodiments, the method may proceed directly from step 202 to step 210. That is, deployment of the UAV may be initiated directly upon a determination that the primary power supply for the base station 102 has failed or will fail. In either case, therefore, step 210 is responsive to the determination in step 202.

In some embodiments, the method may further comprise, prior to initiating deployment of the UAV 108 in step 210, determining a priority level associated with the base station 102. The method further comprises determining to initiate deployment of the UAV 108 based on the priority level.

The priority level may be determined based on a likelihood of failure of the primary power supply. For example, a first base station with primary power supply with a higher risk of failure than a primary power supply in a second base station may be associated with a higher priority level than the second base station. In some embodiments, the likelihood of failure of the primary power supply may be determined based on a predictive model, such as the predictive model described with respect to step 202.

The priority level may be determined based on a volume of traffic handled by the base station 102. In some embodiments, a first base station that handles a higher volume of traffic than a second base station may be associated with a higher priority level than the second base station.

The priority level may be determined based on priority levels associated with traffic flows handled by the base station 102. The priority levels associated with traffic flows may be associated with Quality of Service requirements for the traffic flows.

In some embodiments, the priority level may be determined based on a proximity of the base station 102 to a neighbouring base station. In some embodiments, the priority level may be determined based on an overlap in coverage area between the base station 102 and a neighbouring base station. For example, a first base station with a coverage area that falls entirely within or overlaps with a coverage area of a second base station may be assigned a lower priority than a third base station with a coverage area that does not overlap with a coverage area of any other base station.

The priority level may be determined based on the accessibility of the base station 102, and in particular, the accessibility of the base station 102 for land vehicles. In some embodiments, a first base station that can only be accessed by land vehicles via difficult terrain may be associated with a higher priority level than a second base station that is accessible by land vehicles via easier terrain (e.g. roads). For example, a first base station that cannot be accessed by land vehicles may be associated with a higher priority level than a second base station that can be accessed by land vehicles. Additionally or alternatively, a first base station that is inaccessible at particular times of day or times of year may be associated with a higher priority level than a second base station that is accessible for longer periods of time.

The priority level may be based on any combination of the aforementioned factors. For example, the priority level may be based on a sum of parameters determined by the aforementioned factors (such as a weighted sum).

The step of determining to initiate deployment of the UAV 108 based on the priority level comprises determining that the priority level is greater than a threshold priority level. The threshold priority level may be generic, i.e. defined for any base station in the communication network. Alternatively, the threshold priority level may be specific to the base station 102 or a group of base stations to which the base station 102 belongs. Alternatively or additionally, determining to initiate deployment of the UAV 108 based on the first priority level comprises determining that the priority level is greater than a priority level associated with a second base station in the communication network. For example, particularly where fewer UAVs are available for deployment than there are base stations experiencing failures in their respective primary power supplies, such embodiments enable those base stations with the highest priority to have their batteries recharged.

As described above, according to embodiments of the disclosure a UAV 108 is deployed to a base station 102 to charge batteries providing a secondary power supply for the base station 102. The UAV 108 may comprise one or more power sources. The one or more power sources may comprise a solar cell, a wind turbine, a UAV battery, a generator, a water turbine and/or any other suitable power source. The UAV 108 may thus fly to a base station 102 and use one of the one or more power sources in the UAV 108 to charge the base station batteries. The batteries for the base station 102 can thus be recharged, thereby delaying or preventing any potential disruptions to base station operations that may have been caused by a failure in the primary power supply for the base station 102. Further detail concerning this aspect is provided below.

Figure 3:
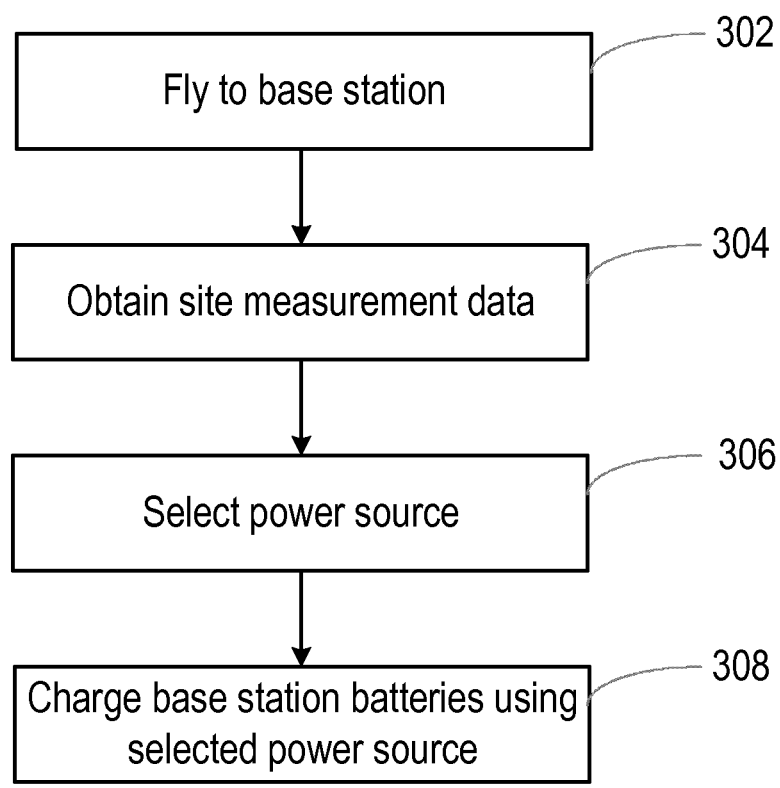
FIG. 3 is a flowchart of a method implemented in an unmanned aerial vehicle according to embodiments of the disclosure.

FIG. 3 is a flowchart of a method 300 implemented in a UAV in a communication network according to embodiments of the disclosure. The UAV may be the UAV 108 illustrated in FIG. 1, for example. The communication network may comprise the communication system 100 illustrated in FIG. 1.

In some embodiments, the method may occur responsive to signalling received from a node in the communication network. In some embodiments, the method may occur responsive to signalling received from a base station, a UAV depot, a management apparatus or another UAV (such as the base stations 102, the management apparatus 104, and/or the UAV 108 described above).

In step 302, the UAV 108 flies to a base station 102 in the communication network. The UAV 108 is provided with location information for the base station 102. In some embodiments, the UAV 108 may be pre-programmed with location information for the base station 102. In some embodiments, the UAV may be provided with location information for the base station 102 via signalling from the base station 102, the management apparatus 104, the UAV depot 106, another UAV or any suitable node in the communication network. The UAV 108 may be provided with a navigation system which may be used to navigate the UAV 108 to the base station 102. The navigation system may be autonomous, or it may be remotely operated by a user.

In step 304, the UAV 108 obtains measurement data relating to a site of the base station 102. In some embodiments, the measurement data may be received via signalling from the base station 102, the UAV depot 106, the management apparatus 104, another UAV, or any other node in the communication network.

Alternatively or additionally, the UAV 108 may obtain the measurement data by performing measurements itself at or near to the site of the base station 102. The UAV 108 may comprise apparatus for performing such measurements, such as one or more of the following: a camera, a photometer, a wind meter and a water flow meter.

The measurement data may relate to the availability of alternative power supplies in the vicinity of the base station 102, and/or the efficiency of those alternative power supplies. For example, the measurement data may comprise one or more of the following: proximity of the base station site to a watercourse or body of water; the flow rate of water in a watercourse or body of water proximate to the site; wind speed at the site; and sunlight intensity at the site.

For example, the UAV 108 may use a camera or similar device to obtain imaging data of the base station site in order to estimate the proximity of a watercourse or body of water to the site, and/or a flow rate of water in a watercourse or body of water proximate to the site. The UAV 108 may use a photometer to obtain measurements of sunlight intensity at the base station site, and/or a wind meter to measure the wind speed.

In step 306, the UAV 108 selects a power source from a plurality of power sources in the UAV 108, for use in charging the one or more batteries of the base station. The plurality of power sources may comprise any suitable power source, but in one embodiment comprise one or more of the following: a solar cell, a wind turbine, a UAV battery, a generator, and a water turbine.

The UAV 108 may select a power source based on the measurement data obtained in step 304. For example, the UAV 108 may select a solar cell based on measurements of sunlight intensity at the base station site (e.g., if the sunlight intensity is above a certain threshold). For example, the UAV 108 may select a wind turbine based on measurements of wind speed at the base station site (e.g., if the wind speed is above a certain threshold).

In some embodiments, the UAV 108 may select a power source based on the status of one or more of the plurality of power sources. For example, the UAV 108 may comprise one or more batteries (e.g., separate batteries, or batteries which supply power to the UAV 108 itself), and the UAV 108 may select a power source based on the status of the one or more UAV batteries. The status of the one or more UAV batteries may comprise information relating to the remaining charge or capacity of the one or more UAV batteries.

In some embodiments, the UAV 108 may select a power source using a selection model. In some embodiments, the selection model may assign a ranking to each of the power sources in the plurality of power sources, and a power source may be selected based on the rankings.

The selection model may comprise a regression model. The selection model may be developed using a machine-learning algorithm. Several different machine learning techniques may be used for the machine-learning algorithm, including decision trees, random forests, neural networks, recurrent neural networks/long-short term memory etc. The present disclosure is not limited in that respect. The selection model may be specific to the UAV 108, to the base station 102 or both the UAV 108 and the base station 102. Alternatively, the selection model may be generic, i.e. defined for any base station or UAV, or defined for any base station or UAV in the communication network.

The selection model may take the measurement data obtained by the UAV 108 in step 304 as input. The selection model may additionally or alternatively take information relating to available hardware at the base station site as input.

In some embodiments of the present disclosure, the UAV 108 may select in step 306 two or more power sources from the plurality of power sources. For example, the UAV 108 may determine in step 306 that one of the plurality of power sources may not be able to charge the one or more batteries providing a secondary power supply for the base station 102 at a maximum charge rate for the one or more batteries. The UAV 108 may thus determine to select two or more power sources from the plurality of power sources, which may increase the rate at which the UAV 108 is able to charge the one or more batteries providing a secondary power supply for the base station 102.

In step 308, the UAV 108 charges one or more batteries providing a secondary power supply for the base station 102 using the power source selected in step 306. The UAV 108 may use a wired connection to charge the batteries, or the UAV 108 may charge the batteries wirelessly.

In some embodiments, one or more of the plurality of power sources in the UAV 108 may be used as a power supply for the UAV 108. In some embodiments, the UAV 108 may thus use its own power supply to charge the one or more batteries providing a secondary power supply to the base station 102. For example, the UAV 108 may be provided with one or more UAV batteries that provide a primary power supply for the UAV 108. The UAV 108 may use the UAV batteries to charge the batteries providing a secondary power supply to the base station 102. In some embodiments, the UAV 108 may cease charging the batteries providing a secondary power supply to the base station 102 when the charge in the UAV batteries reaches a minimum charge level.

Alternatively, the UAV 108 may continue charging the batteries providing a secondary power supply to the base station 102 until the UAV batteries are completely discharged.

In some embodiments, prior to charging the one or more batteries at the base station 102, the UAV 108 docks at the base station 102 or at the site of the base station 102.

The base station 102 and/or the base station site may have one or more docking locations for the UAV 108. The UAV 108, the base station 102 and/or the base station site may include docking apparatus to facilitate docking of the UAV 108 at one of the docking locations. The docking apparatus may comprise one or more of: a landing pad, landing gear and a securing system for securing the UAV 108 to the base station 102 or the base station site. The securing system may include one or more of: a robotic arm, a tether, a clamp or any suitable means for securing the UAV 108.

The docking apparatus may further comprise one or more components for establishing a power and/or data connection between the UAV 108 and one or more of the following: the base station 102, the one or more batteries providing a secondary power supply for the base station 102, and the primary power supply for the base station 102. For example, the docking apparatus may comprise a wire or cable configured to connect the UAV 108 to the base station 102. For example, if the UAV 108 is provided with one or more UAV batteries, the docking apparatus may comprise charging components for charging the UAV batteries using the primary power supply for the base station 102. Thus, once the primary power supply for the base station 102 has been restored, the UAV 108 may recharge its UAV batteries using the primary power supply for the base station 102.

In some embodiments, if the UAV 108 is unable to recharge the batteries providing a secondary power supply to the base station 102 to a threshold charge level, then a second UAV may be deployed to the base station 102. In some example embodiments, a second UAV may be deployed to the base station 102 responsive to a determination that the UAV 108 is unable to recharge the batteries providing the secondary power supply to the base station 102 to a threshold charge level. The determination may be made at the base station 102, the UAV 108, the management apparatus 104, the UAV depot 106 or any other suitable node in the communication network.

The threshold charge level may be predetermined. The UAV 108 may be configured with the threshold charge level. The threshold charge level may be specific to the base station 102. The threshold charge level may be generic (i.e. defined for any base station, or defined for any base station in the communication network).

Thus FIGS. 2 and 3 set out methods by which a UAV may charge the batteries of one or more base stations affected by a primary power supply failure.

Figure 4:
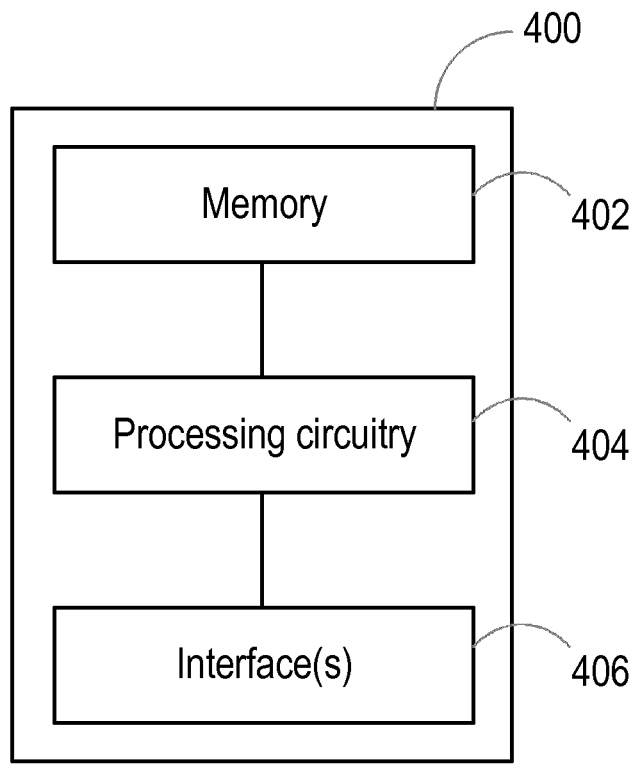
FIGS. 4 and 5 illustrate a management apparatus according to embodiments of the disclosure.

FIG. 4 is a schematic diagram of a management apparatus 400 according to embodiments of the disclosure. The management apparatus 400 may be configured to carry out the method described above with respect to FIG. 2, for example. In one embodiment, the management apparatus 400 comprises a network node, such as the management node 104 described above with respect to FIG. 1.

The management apparatus 400 comprises processing circuitry 404 and a machine-readable medium (such as memory) 402. The machine-readable medium stores instructions which, when executed by the processing circuitry 404, cause the management apparatus 400 to: responsive to a determination that a primary power supply for a base station in the wireless communication network has failed or is predicted to fail, initiate deployment of an unmanned aerial vehicle to the base station to charge one or more batteries providing a secondary power supply for the base station.

In the illustrated embodiment, the management apparatus 400 also comprises one or more interfaces 406, for receiving signals from other nodes of the network and/or transmitting signals to other nodes of the network. The interfaces 406 may use any appropriate communication technology, such as electronic signalling, optical signalling or wireless (radio) signalling.

In the illustrated embodiment, the processing circuitry 404, the machine-readable medium 402 and the interfaces 406 are operatively coupled to each other in series. In other embodiments, these components may be coupled to each other in a different fashion, either directly or indirectly. For example, the components may be coupled to each other via a system bus or other communication line.

Figure 5:
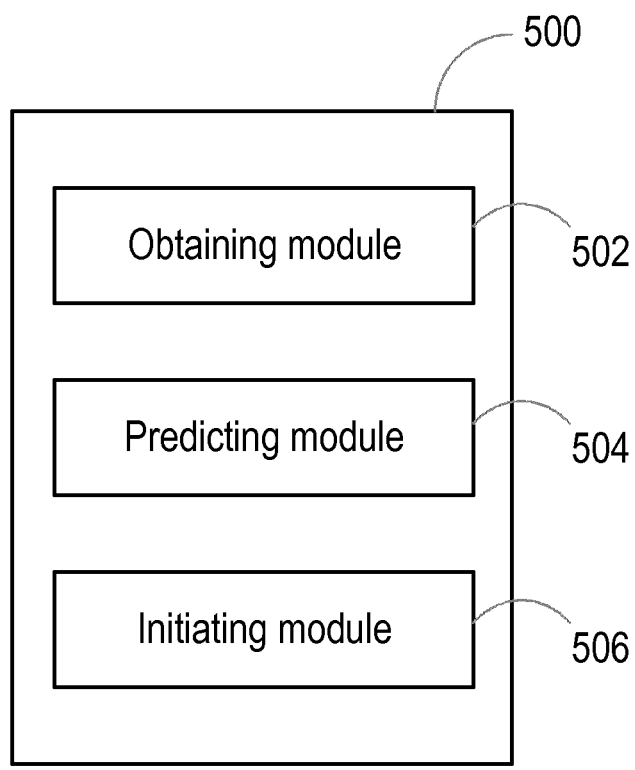

FIG. 5 is a schematic diagram of a management apparatus 500 according to embodiments of the disclosure. The management apparatus 500 may be configured to carry out the method described above with respect to FIG. 2, for example. In one embodiment, the management apparatus 400 comprises a network node, such as the management node 104 described above with respect to FIG. 1.

The management apparatus 500 comprises an initiating module 506. The initiating module 506 is configured to, responsive to a determination that a primary power supply for a base station in the wireless communication network has failed or is predicted to fail, initiate deployment of an unmanned aerial vehicle to the base station to charge one or more batteries providing a secondary power supply for the base station.

In the illustrated embodiment, the management apparatus 500 further comprises a predicting module 504. The predicting module 504 is configured to determine a predicted duration of the failure of the primary power supply. In such embodiments, the deployment of an unmanned aerial vehicle is further initiated responsive to a determination that the one or more batteries in the base station are unable to power the base station for the predicted duration of the failure of the primary power supply.

In the illustrated embodiment, the management apparatus 500 further comprises an obtaining module 502. The obtaining module 502 is configured to obtain one or more of: a predicted power consumption of the base station; a discharge rate for the one or more batteries; a remaining charge of the one or more batteries; a degradation curve for the one or more batteries; and measurement data relating to a temperature of the one or more batteries. The determination that the one or more batteries in the base station are unable to power the base station for the predicted duration of the failure of the primary power supply is further based on the obtained quantities.

The management apparatus 500 may also comprise one or more interface modules (not illustrated), for receiving signals from other nodes of the network and/or transmitting signals to other nodes of the network. The interfaces may use any appropriate communication technology, such as electronic signalling, optical signalling or wireless (radio) signalling.

Figure 6:
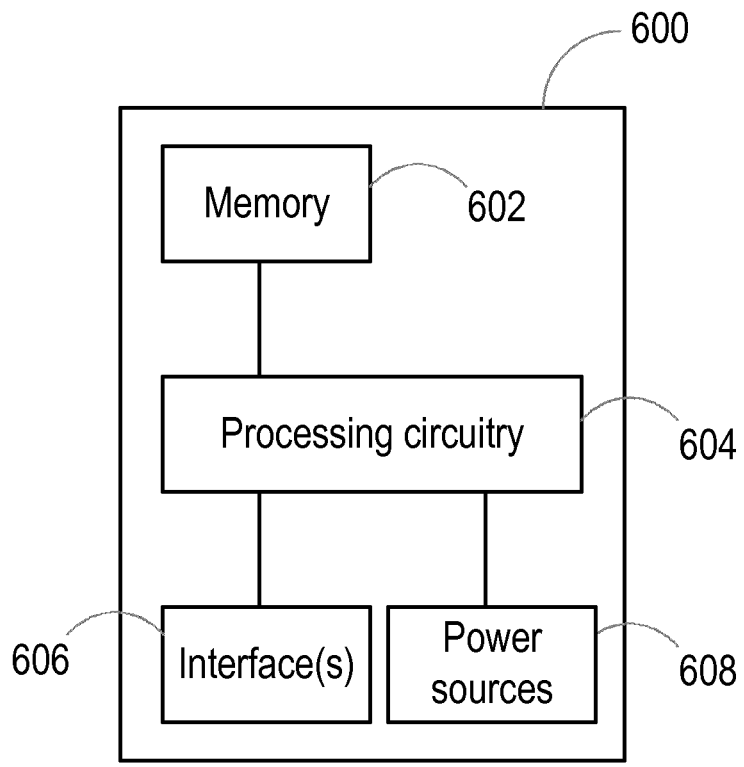
FIGS. 6 and 7 illustrate an unmanned aerial vehicle according to embodiments of the disclosure.

FIG. 6 is a schematic diagram of a UAV 600 according to embodiments of the disclosure. The UAV 600 may be configured to carry out the method described above with respect to FIG. 3, for example. In one embodiment, the UAV 600 may be implemented as the UAV 108 described above with respect to FIG. 1.

The UAV 600 comprises processing circuitry 604, a machine-readable medium (such as memory) 602, and a plurality of power sources 608. The machine-readable medium stores instructions which, when executed by the processing circuitry 604, cause the UAV 600 to: fly to a base station in the wireless communication network; select a power source from the plurality of power sources 608 in the unmanned aerial vehicle; and charge one or more batteries providing a secondary power supply for the base station using the selected power source.

In the illustrated embodiment, the UAV 600 also comprises one or more interfaces 606, for receiving signals from other nodes of the network and/or transmitting signals to other nodes of the network. The interfaces 606 may use any appropriate communication technology, such as electronic signalling, optical signalling or wireless (radio) signalling.

In the illustrated embodiment, the processing circuitry 604, the machine-readable medium 602 and the interfaces 606 are operatively coupled to each other in series. In other embodiments, these components may be coupled to each other in a different fashion, either directly or indirectly. For example, the components may be coupled to each other via a system bus or other communication line.

It will further be understood that the UAV 600 comprises necessary systems for flight, such as one or more propellers and one or more motors (which are usually electric). The UAV 600 may also comprise a guidance system, which may be automated.

Figure 7:
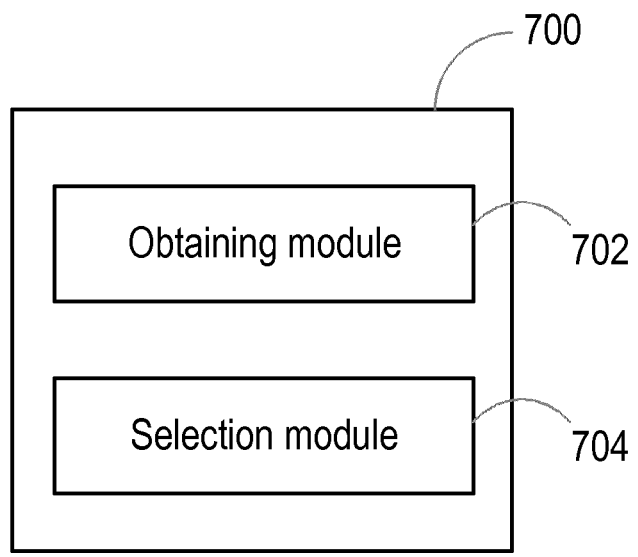

FIG. 7 is a schematic diagram of a UAV 700 according to embodiments of the disclosure. The UAV 700 may be configured to carry out the method described above with respect to FIG. 3, for example. In one embodiment, the UAV 700 is implemented as the UAV 108 described above with respect to FIG. 1.

The UAV 700 comprises a selection module 704. The selection module 704 is configured to select, once the UAV 600 has flown to a base station in the wireless communication network, a power source from the plurality of power sources in the unmanned aerial vehicle, and to charge one or more batteries providing a secondary power supply for the base station using the selected power source.

In the illustrated embodiment, the UAV 700 further comprises an obtaining module 702, which is configured to obtain measurement data relating to a site of the base station, with the selected power source being selected based on the measurement data. The measurement data may comprise one or more of: proximity of the site to a watercourse or body of water; flow rate of water in a watercourse or body of water proximate to the site; wind speed at the site; and sunlight intensity at the site.

The UAV 700 may also comprise one or more interface modules (not illustrated), for receiving signals from other nodes of the network and/or transmitting signals to other nodes of the network. The interfaces may use any appropriate communication technology, such as electronic signalling, optical signalling or wireless (radio) signalling.

It will further be understood that the UAV 600 comprises necessary systems for flight, such as one or more propellers and one or more motors (which are usually electric). The UAV 600 may also comprise a guidance system, which may be automated.

The modules described above with respect to FIGS. 5 and 7 may comprise any combination of hardware and/or software. For example, in one embodiment, the modules are implemented entirely in hardware. As noted above, hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions. In another embodiment, the modules may be implemented entirely in software. In yet further embodiments, the modules may be implemented in combinations of hardware and software.

The present disclosure therefore provides methods, apparatus and machine-readable mediums for mitigating power failures in a wireless network. Specifically, unmanned aerial vehicles are employed to charge batteries providing a secondary power supply to a base station which has suffered a power failure in its primary power supply. The unmanned aerial vehicle may further be configured to select a power source from a plurality of available power sources in order to charge the batteries.

It should be noted that the above-mentioned embodiments illustrate rather than limit the concepts disclosed herein, and that those skilled in the art will be able to design many alternative embodiments without departing from the scope of the appended following claims. The word "comprising" does not exclude the presence of elements or steps other than those listed in a statement, "a" or "an" does not exclude a plurality, and a single processor or other unit may fulfil the functions of several units recited in the statements. Any reference signs in the claims shall not be construed so as to limit their scope.

The invention claimed is:

1. A method for mitigating power failure in a wireless communication network provided by at least one base station, said at least one base station comprising a primary power supply and a secondary power supply, the method comprising:
   (i) receiving a first signal indicating that the primary power supply of said at least one base station has failed or is predicted to fail, or (ii) failing to receive a second signal indicating that the base station is operating normally;
   based at least on determining that the primary power supply of said at least one base station has failed or is predicted to fail, transmitting a signal to an unmanned aerial device (UAD) to trigger the UAD to travel to said at least one base station to charge the secondary power supply of said at least one base station, wherein
   the secondary power supply of said at least one base station comprises one or more batteries,
   charging the secondary power supply of said at least one base station comprises charging said one or more batteries,
   that the primary power supply of said at least one base station has failed or is predicted to fail is determined based on receiving the first signal or failing to receive the second signal, and
   the method further comprises:
      obtaining an indication indicating that the UAD is unable to charge said one or more batteries serving as the secondary power supply of said at least one base station; and
      based on obtaining the indication, transmitting a signal to another UAD to trigger said another UAD to travel to said at least one base station to charge said one or more batteries serving as the secondary power supply of said at least one base station.

2. The method according to claim 1, further comprising: determining a predicted duration of the failure of the primary power supply, wherein the step of transmitting the signal to the UAD is performed further based on a determination that the secondary power supply of the base station is unable to power the base station for the predicted duration of the failure of the primary power supply.

3. The method according to claim 2, wherein the determination that the one or more batteries in the base station are unable to power the base station for the predicted duration of the failure of the primary power supply is based on one or more of the following:
   a predicted power consumption of the base station;
   a discharge rate for the one or more batteries;
   a remaining charge of the one or more batteries;
   a degradation curve for the one or more batteries; and
   measurement data relating to a temperature of the one or more batteries.

4. The method according to claim 2, wherein the determination that the primary power supply is predicted to fail and/or the predicted duration of the failure of the primary power supply is obtained from one or more predictive models developed using one or more machine-learning algorithms.

5. The method according to claim 4, wherein at least one of the one or more predictive models takes one or more of the following as input:
   measurement data relating to historical performance of the primary power supply;
   measurement or forecasting data relating to weather conditions affecting the primary power supply; and
   information relating to maintenance or construction works affecting the base station or the primary power supply.

6. The method according to claim 1, further comprising: prior to transmitting the signal to the UAD,
   determining a first priority level associated with the base station; and
   determining to transmit the signal to the UAD based on the first priority level.

7. The method according to claim 6, wherein determining to transmit the signal to the UAD based on the first priority level comprises determining that the first priority level is greater than a threshold priority level.

8. The method according to claim 6, wherein determining to transmit the signal to the UAD based on the first priority level comprises determining that the first priority level is greater than a second priority level associated with a second base station in the wireless communication network.

9. The method according to claim 6, wherein the first priority level is determined based on one or more of the following:
   a volume of traffic flows handled by the base station;
   priority levels associated with traffic flows handled by the base station; and
   accessibility of the base station for land vehicles.

10. A method performed by an unmanned aerial device (UAD) for mitigating power failure in a wireless communication network provided by at least one base station, said at least one base station comprising a primary power supply and a secondary power supply, the method comprising:
   flying to said at least one base station in the wireless communication network;
   selecting one or more power sources from a plurality of power sources in the UAD; and after the primary power supply of said at least one base station has failed or is predicted to fail, charging the secondary power supply of said at least one base station using the selected one or more power sources, wherein the secondary power supply of said at least one base station comprises one or more batteries, charging the secondary power supply of said at least one base station comprises charging said one or more batteries, the method comprises determining that one of the plurality of power sources in the UAD is unable to charge said one or more batteries serving as the secondary power supply for said at least one base station, and selecting said one or more power sources from the plurality of power sources in the UAD comprises selecting more than one power sources based on the determination.

11. The method according to claim 10, the method further comprising:
obtaining measurement data relating to a site of the base station, wherein the selected one or more power sources is selected based on the measurement data.

12. The method according to claim 11, wherein the measurement data comprises one or more of the following:
proximity of the site to a watercourse or body of water;
flow rate of water in a watercourse or body of water proximate to the site;
wind speed at the site; and
sunlight intensity at the site.

13. The method according to claim 10, wherein the selected one or more power sources is selected based on available hardware at the site of the base station.

14. The method according to claim 10, wherein the UAD comprises one or more batteries, and the selected one or more power sources is selected based on the status of the one or more batteries in the UAD.

15. The method according to claim 10, wherein the selected one or more power sources is selected using a predictive model, wherein the predictive model is developed using a machine-learning algorithm.

16. The method according to claim 10, wherein the plurality of power sources comprises one or more of the following:
a solar cell;
a wind turbine;
an UAD battery;
a generator; and
a water turbine.

17. A management apparatus for mitigating power failure in a wireless communication network provided by at least one base station, said at least one base station comprising a primary power supply and a secondary power supply, the management apparatus comprising:
processing circuitry; and
a non-transitory machine-readable medium coupled to the processing circuitry and storing code which, when executed by the processing circuitry, causes the management apparatus to:
(i) receive a first signal indicating that the primary power supply of said at least one base station has failed or is predicted to fail, or (ii) fail to receive a second signal indicating that the base station is operating normally; and based at least on determining that the primary power supply of said at least one base station has failed or is predicted to fail, transmit a signal to an unmanned aerial device (UAD) to trigger the UAD to travel to said at least one base station to charge the second power supply of said at least one base station, wherein the secondary power supply of said at least one base station comprises one or more batteries, charging the secondary power supply of said at least one base station comprises charging said one or more batteries, that the primary power supply of said at least one base station has failed or is predicted to fail is determined based on receiving the first signal or failing to receive the second signal, and the management apparatus is configured to:
obtain an indication indicating that the UAD is unable to charge said one or more batteries serving as the secondary power supply of said at least one base station; and
based on obtaining the indication, transmit a signal to another UAD to trigger said another UAD to travel to said at least one base station to charge said one or more batteries serving as the secondary power supply of said at least one base station.

18. An unmanned aerial device (UAD) for mitigating power failure in a wireless communication network provided by at least one base station, said at least one base station comprising a primary power supply and a secondary power supply, the UAD comprising:
processing circuitry;
a plurality of power sources; and
a non-transitory machine-readable medium coupled to the processing circuitry and storing code which, when executed by the processing circuitry, causes the UAD to:
fly to said at least one base station in the wireless communication network;
select one or more power sources from a plurality of power sources in the UAD; and
after the primary power supply of said at least one base station has failed or is predicted to fail, charge the secondary power supply of said at least one base station using the selected one or more power sources, wherein
the secondary power supply of said at least one base station comprises one or more batteries, and
charging the secondary power supply of said at least one base station comprises charging said one or more batteries,
the UAD is configured to determine that one of the plurality of power sources in the UAD is unable to charge said one or more batteries serving as the secondary power supply for said at least one base station, and
selecting said one or more power sources from the plurality of power sources in the UAD comprises selecting more than one power sources based on the determination.

* * * * *